United States Patent Office 3,415,145
Patented Dec. 10, 1968

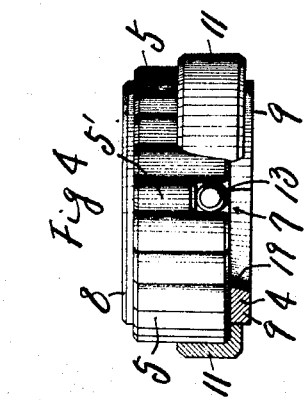
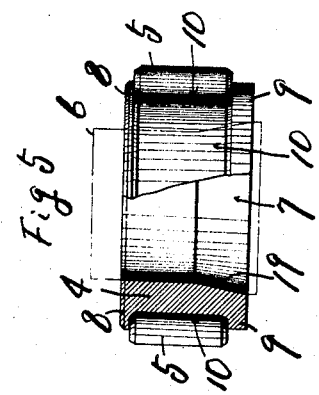
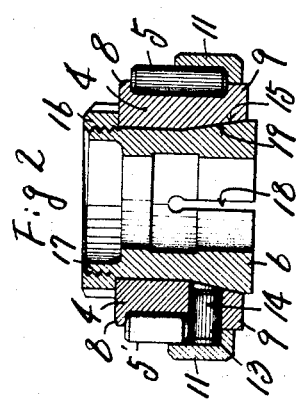
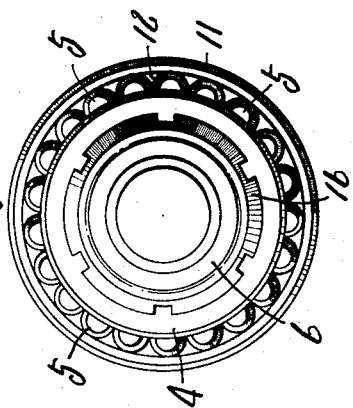
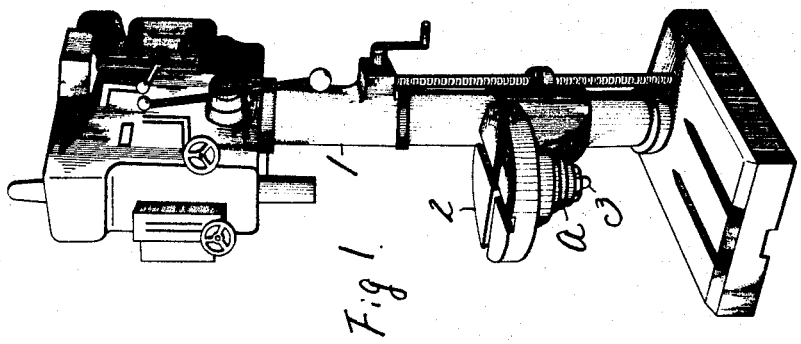

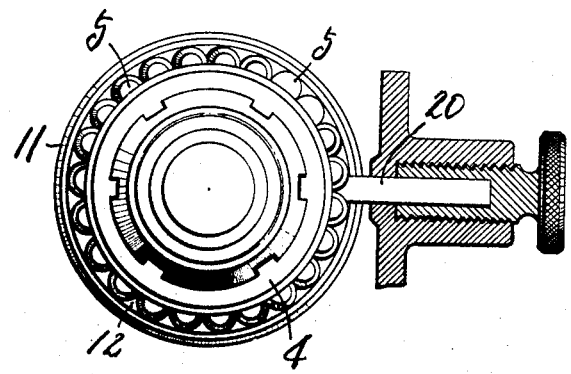
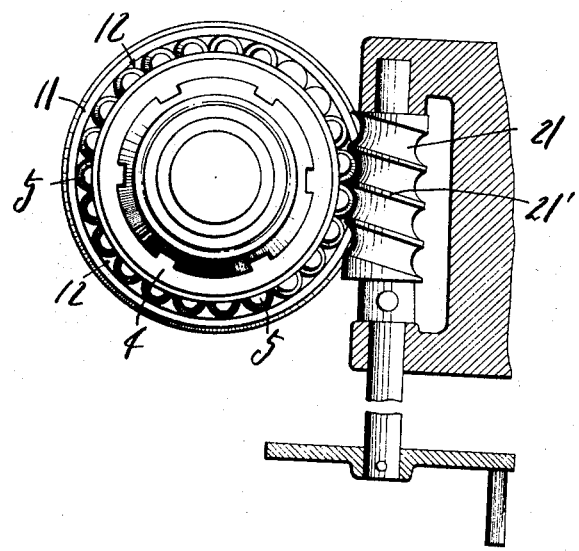

3,415,145
DIVIDING UNIT FOR DIVIDING DEVICES FOR MACHINE TOOLS
Shigeru Takamori, Nishinomiya-shi, Japan, assignor to Asahi Kiko Hanbai Kabushiki Kaisha, Nishinomiya-shi, Hyogo-ken, Japan
Filed Dec. 13, 1966, Ser. No. 601,525
Claims priority, application Japan, Dec. 25, 1965, 40/79,062
3 Claims. (Cl. 74—813)

ABSTRACT OF THE DISCLOSURE

A dividing unit for dividing devices is provided by locating a set of cylindrical rollers of precisely similar diameters, in axially parallel contact with each other, in an annular cylindrical recess in an inner ring and pressing the assembly of rollers into a precisely annular array by an outer ring having a shrink fit thereto and covering about half the length of the rollers leaving exposed the axially extending precision indexing grooves found between the exposed parts of the axially extending rollers. The outer ring may also cover a restricting rod of roller diameter driven into the inner ring in alignment with a shortened roller.

---

The present invention relates to a dividing device (dividing master unit) for making a circumferential or angular division in connection with various machine tools such as milling machines, drilling machines, boring machines, grinding machines and presses.

The invention has for its object the provision of an improved dividing device which is much higher in precision, easier to manufacture and less expensive than the conventional dividing apparatus.

The manufacture of the conventional dividing apparatus (dividing master unit) requires the cutting of a predetermined number of notches equispaced around the circumference of a circular plate which serves as the base plate. The accurate cutting of a predetermined number of circumferentially disposed notches of constant width while maintaining a constant pitch, however, offers tremendous difficulties from the viewpoint of machine work and requires much trouble so that the products are very expensive.

The invention is intended to eliminate these drawbacks inherent to the prior art and produce the articles with great ease and convenience, the basic concept of the invention residing in the fact that a number of rollers of precisely equal diameter are juxtaposed each in closely contacted relation to adjacent rollers around the outer peripheral surface of a cylindrical body, each of said rollers being fixed in position by means of a suitable method so as not to allow it to roll on the circumferential surface of said cylindrical body, and a dividing pin or worm gear adapted to be engaged with the grooves each defined by adjacent rollers thereby to effect the dividing operation.

The invention will now be described in more detail with reference to an embodiment thereof illustrated in the accompanying drawings, in which, FIG. 1 is a perspective view of a drilling machine, showing a mode of use of the dividing device according to the invention;

FIG. 2 is a front view, in longitudinal section, of the present dividing device;

FIG. 3 is a top plan view thereof;

FIG. 4 is a side elevational view thereof;

FIG. 5 is a plan view of a cylindrical body, the left-hand half of the view being shown in section; and FIGS. 6 and 7 are plan views showing different manners of the use of the device.

FIG. 1 shows an instance in which the present dividing device is installed on a drilling machine 1. In this case, the dividing device $a$ is mounted on a support shaft 3 for a workpiece clamping table 2, whereby the circumferential equal division of a work-piece to be drilled is effected.

As shown in FIGS. 2 through 4, the dividing device $a$ comprises a number of cylindrical rollers 5 of equal diameter finished with high precision are arranged each in closely contacted relation to adjacent cylindrical rollers around the outer peripheral surface of a cylindrical body 4, said rollers being shrink-fitted in said relation so that they may not roll on the cylindrical body 4.

These rollers 5 have substantially no matching error in dimension, i.e., the dimensional equality of their diameter is established substantially or to a high degree. These equal-diameter rollers 5 are obtained in such a way that such rollers are produced in large amounts and are then accurately measured one by one with respect to their diameters to pick up those rollers which have substantially no error, the thus selected rollers being then divided into groups and one such group of rollers are arranged on the outer peripheral surface of the cylindrical body 4.

As shown in FIG. 5, the cylindrical body 4 has a central bore 7 to receive a collet 6 to be fitted therein and also has upper and lower flanges 8 and 9 integrally formed with the body. Thus the rollers 5 are juxtaposed in a circumferential groove 10 defined by said flanges 8 and 9. They are all shrink-fitted within the groove 10. Consequently they cannot move laterally within the groove 10.

As mentioned above, first, rollers 5 having a precisely equal diameter are prepared and, secondly, a cylindrical body 4 is prepared by machining process, which body has an outer peripheral surface on which rollers 5 whose number corresponds to the number of divisions are arranged each in closely contacted relation to adjacent rollers. The drawings show an instance in which 22 rollers 5 are closely fitted in the cylindical body 4 having a circumferential length which is just enough to accommodate the 22 rollers juxtaposed thereon each in closely contacted relation to adjacent rollers.

An outer ring 11 is shrink-fitted on the group of the thus closely contacted and closely fitted twenty-two rollers 5 disposed on the body 4.

The outer ring 11 is so dimensioned as to cover a region extending from below up to approximately half the height of the rollers 5. Consequently, approximately half the length of the rollers 5 is exposed thus presenting grooves 12 each formed between adjacent rollers, with which grooves a pin or the teeth of a worn gear are engaged.

In order to prevent these rollers 5 from moving laterally within the circumferential groove 10 on the outer peripheral surface of the cylindrical body 4, a restriction rod 13 may be used as shown in FIGS. 2 and 4. The restriction rod 13 is driven from the outside into a hole 14 diametrically bored in the cylindrical body 4 above the flange 9 thereof, the protruding portion of said restriction rod being disposed between two rollers 5. The restriction rod 13 has the same diameter as the rollers 5, so that it can be closely fitted between adjacent rollers. Only the roller 5′ that is disposed at the location in which the restriction rod is fitted is reduced in length by an amount equal to the diameter of the restriction rod 13.

The collet 6 by means of which the dividing device of the present invention is attached to various machine tools or the dividing shaft of a working jig is in the form of a cylindrical body having a diverging tapered lower portion 15 and threads 17 cut around the upper peripheral portion on which a clamping nut 16 is to be threadedly fitted, said lower tapered portion being formed with three circumferentially equispaced cut-outs 18 extending from the end surface. The tapered portion 15 is tightly fitted in the internally tapered portion 19 of the cylindrical body 4. Thus, the collet 6 is inserted from below into the cylindrical body 4 and the clamping nut 16 is threadedly engaged with the threads 17 on the upper part of the collet, whereby the two members 4 and 6 are rigidly coupled.

It is thus seen that the dividing device according to the invention comprises a number of rollers of precisely equal diameter each juxtaposed in closely contacted relation to adjacent rollers around the outer peripheral surface of a cylindrical body, said rollers being fixed in position by means of a suitable method so as not to allow them to roll on the circumferential surface of the cylindrical body, and a dividing pin 20 or the teeth 21' of a worm gear 21 are engaged with the grooves 12 each defined by adjacent rollers. As a result of this arrangement, there can be assured a high degree of precision with which dividing operation on machine tools or working jig is effected, and it is possible to avoid errors which would be otherwise occurrable due to the complexity of dividing mechanisms and dividing calculations.

Further, since the dividing device of the invention is produced by fixing a number of roller of precisely equal diameter around the outer peripheral surface of a cylindrical body, the production is very easy and the cost is low.

What is claimed is;

1. A dividing assembly for dividing devices for machine tools which comprises
    (a) a group of cylindrical rollers of precisely equal diameter corresponding in number to the number of divisions to be produced,
    (b) an inner ring provided with an external cylindrical annular groove in which said cylindrical rollers are mounted in axially parallel contact with each other, and
    (c) an outer ring shrink-fitted on said rollers and locking them immovably in said annular groove,
whereby said dividing assembly is rigidified and provided with fixed axially extending index grooves defined by the mutually contacting fixedly positioned cylindrical rollers.

2. A dividing assembly as defined in claim 1 in which said outer ring has contact with about half the length of said cylindrical rollers.

3. A dividing assembly as defined in claim 1 in which one of said cylindrical rollers is shorter in length than the others by an amount equal to the diameter of a roller, in which said inner ring has a radial recess formed within and adjacent a wall of said annular groove, in which a restriction rod of the same diameter as a roller is driven radially into said recess and located in juxtaposition to said shorter roller, and in which said recess and restriction rod are enclosed by said outer ring.

References Cited

UNITED STATES PATENTS 3,088,340  5/1963  Shotey _____ 74—813

FOREIGN PATENTS 22,667  1/1907  Sweden.

HALL C. COE, *Primary Examiner.*

U.S. Cl. X.R.

74—425, 457, 458, 462